(12) United States Patent
Schlesser et al.

(10) Patent No.: US 7,261,032 B2
(45) Date of Patent: Aug. 28, 2007

(54) USING AN ESTIMATED HEAT OUTPUT VALUE OF A DIRECT-FIRED STEAM GENERATOR IN CONTROLLING WATER FLOW TO MAINTAIN A DESIRED CONSTANT STEAM TEMPERATURE

(75) Inventors: Walter Mark Schlesser, Ottumwa, IA (US); Eric Ryan Lang, Donnellson, IA (US)

(73) Assignee: Deere & Company, Moline, IL (US)

( * ) Notice: Subject to any disclaimer, the term of this patent is extended or adjusted under 35 U.S.C. 154(b) by 219 days.

(21) Appl. No.: 11/152,905

(22) Filed: Jun. 15, 2005

(65) Prior Publication Data

US 2006/0283164 A1   Dec. 21, 2006

(51) Int. Cl.
*B30B 15/30* (2006.01)

(52) U.S. Cl. .............................. 100/73; 56/341; 100/74; 122/415

(58) Field of Classification Search ................ 100/73, 100/74, 35, 38; 47/1.7; 239/124–127; 122/415, 122/407, 406.3, 36, 406.1, 408.2; 56/341, 56/DIG. 23, 16.4 R, 1, 10.2 B, 16.4 A
See application file for complete search history.

(56) References Cited

U.S. PATENT DOCUMENTS

| | | | | |
|---|---|---|---|---|
| 3,280,543 A | * | 10/1966 | Lawrence et al. | 56/16.4 D |
| 3,439,683 A | * | 4/1969 | Keller | 460/13 |
| 4,030,244 A | * | 6/1977 | Tennes et al. | 47/1.7 |
| 4,352,267 A | * | 10/1982 | Mellinger | 56/341 |
| 4,550,556 A | * | 11/1985 | Meiners | 56/341 |
| 4,644,967 A | | 2/1987 | Wyatt et al. | |
| 4,884,529 A | * | 12/1989 | Byrnes | 122/115 |
| 4,916,888 A | * | 4/1990 | Sheehan et al. | 56/14.7 |
| 5,022,317 A | * | 6/1991 | Williams | 100/35 |
| 6,109,008 A | * | 8/2000 | Staheli | 56/10.2 B |

* cited by examiner

*Primary Examiner*—Árpád Fábián Kovács

(57) ABSTRACT

A direct-fired steam generator used for supplying steam for re-hydrating dry crop during baling is controlled so as to produce a desired constant steam temperature output by collecting data from which the heat output of the steam generator can be calculated and using this calculation together with the difference between the actual steam temperature and the desired steam temperature to control the amount of process water sent to the steam generator in order to correct any error in steam temperature. Steam temperature is measured in either one of the steam injection manifolds or in an injection tube coupled to an injection manifold so as to be close to the point of application of the steam to the crop.

8 Claims, 3 Drawing Sheets

USING AN ESTIMATED HEAT OUTPUT VALUE OF A DIRECT-FIRED STEAM GENERATOR IN CONTROLLING WATER FLOW TO MAINTAIN A DESIRED CONSTANT STEAM TEMPERATURE

FIELD OF THE INVENTION

The present invention relates to direct-fired steam generators, and, more particularly, relates to controlling the steam generator so as to produce a near constant steam temperature by using an estimate of the heat output of the generator.

BACKGROUND OF THE INVENTION

With a direct-fired steam generator, one can directly control the amount of water entering the system, and can indirectly control the amount of heat generated by the system by varying either air flow and/or fuel flow. It is desirable to have a constant steam temperature produced by the steam generator, which, in the present embodiment that is used for re-hydrating crop just prior to baling, has a continuously variable heat output from about 1.5-4.0 million BTU/hr.

Steam temperature differential, i.e., the difference between the present steam temperature and the desired steam temperature, does not provide enough information to control the steam temperature within the desired response time. At different heat outputs, different amounts of water are needed to get the same change in steam temperature. For example, with the steam generator of the present embodiment, it has been found that when the steam generator is producing 4.0 million BTU/hr it takes a decrease of 0.30 gpm to achieve a water vapor temperature increase from 225° F. to 275° F., or 0.006 gpm/° F., and that half that amount of decrease in water flow is required for producing the same increase in water vapor temperature when the heat output of the steam generator is maintained at 2.0 million BTU/hr.

Accordingly, one needs to know both how much heat is being produced and the difference between the actual and desired temperatures in order to make the changes needed to maintain the desired temperature. Steam generators on the market and used in environments unrelated to creating steam for crop re-hydration offer controls for obtaining stepped steam outputs. The air, fuel and water for each step are manually tuned to achieve a desired steam temperature. The control system opens or closes a set of valves (one for each of the air, fuel, and water) to move to a different output, with each stage set at a predetermined output. U.S. Pat. No. 4,644,967, granted to Wyatt et. on 24 Feb. 1987 is an example of such a control system. This approach has limited functionality when the steam generator is being used to re-hydrate crop, and has cost and reliability problems due to the size and number of valves.

The problem to be solved then is to provide a cost-effective way to control a steam generator, within a relatively short response time, so as to maintain a desired steam temperature.

SUMMARY OF THE INVENTION

According to the present invention, there is provided an improved manner of controlling the operation of a steam generator in order to maintain a constant temperature steam output.

An object of the invention is to use both how much heat is being produced by the steam generator and the difference between the desired and actual temperatures of the produced steam in order to control the steam generator so as to produce steam having the desired temperature.

The proposed control system has sensors for measuring the amount of water going to the steam generator, and, since presently no method of directly measuring the heat output of the burner is known, for gathering data from which an estimate of the heat output of the burner can be made by measuring one or more of the following:

a) air/steam pressure in different parts of the air/steam system,
b) the differential pressure in different parts of the air/steam system,
c) blower speed,
d) blower power consumption,
e) fuel flow into the burner, and
f) air/mass flow or air volumetric flow into the burner.

Since the heat output is proportional to the air flow and fuel flow through the steam generator, the measured values of one, or both, of these factors, can be directly and/or indirectly related to incremental changes in water flow. Thus, this allows target values to be stored, as a look up table, in the memory of the controller to correctly match the water flow to the heat output. The control system then makes small adjustments to either the water flow or heat output based on the difference between the actual steam temperature and the desired steam temperature to cause the generator to produce steam having the desired temperature.

DESCRIPTION OF THE PREFERRED EMBODIMENT

Figure 1:
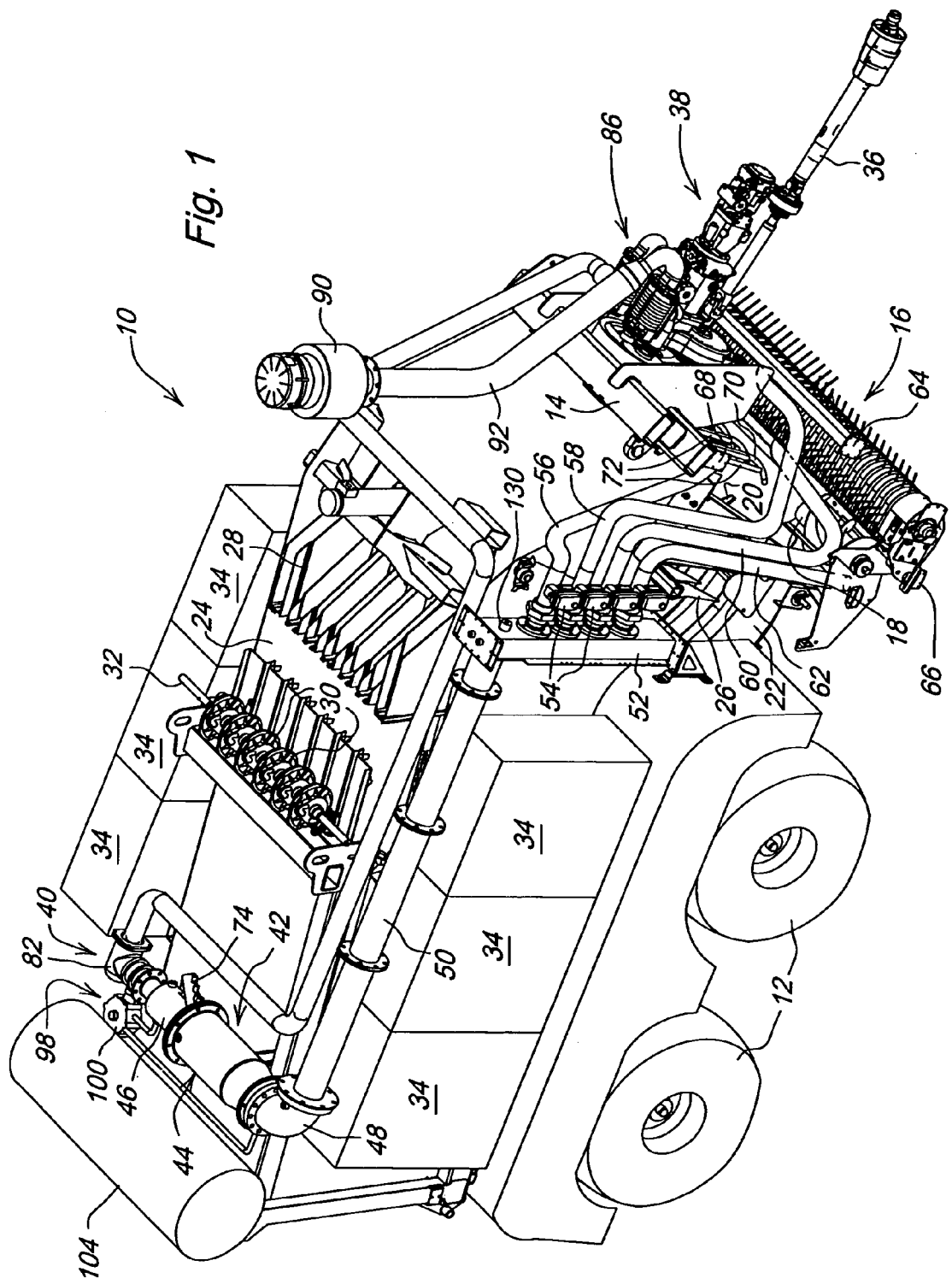
FIG. 1 is a right front perspective view of a baler equipped with a steam generator system with which the control of the present invention is particularly adapted for use.

Referring now to FIG. 1, there is shown a large square baler 10 including a main frame supported on a set of tandem wheels 12 for being towed across the ground by a tractor (not shown) coupled to the forward end of a draft frame (removed) joined to, and extending forwardly from a cross beam structure 14 forming a forward end of the main frame. Suspended from a forward location of the main frame is a crop gathering pick-up 16 having a tined reel operable for elevating a windrow of crop and delivering it to a pair of stub augers 18 (only one visible) operable for narrowing the stream of crop for being fed, by a packer fork assembly 20 into an inlet (not visible) of a pre-compression chamber 22 which is curved upwardly to the rear. The pre-compression chamber 22 defines an outlet at its upper end (not visible) which registers with an inlet provided at a bottom wall of a fore-and-aft extending baling chamber 24. A stuffer fork 26 is selectively operable for moving charges of pre-compressed crop from the pre-compression chamber 22 into the baling chamber 24. In a manner known in the art, the charges of crop are intermittently compressed in the baling chamber by rearward movement of a plunger 28 mounted for reciprocating in a forward section of the baling chamber 24 so as to form a bale of compressed crop.

Once a bale of a pre-selected length is formed, the completed bale is bound together by a plurality of strands of twine through the action of a tying system including a twine-delivery needle assembly (not visible) including a plurality of needles mounted for being swung upwardly through the baling chamber 24 from a stand-by position, so as to respectively deliver twine to a plurality of tying devices including respective knotter gears 30 mounted to a knotter shaft 32 extending across the top of the baling chamber 24. A supply of twine for delivery by the needles is provided in the form of balls of twine (not shown) contained within twine storage boxes 34 provided along opposite sides of the baler 10.

Power for driving all of the functions mentioned thus far is derived from the power take-off of the towing vehicle, which is coupled to a drive line 36 coupled to the power take-off. The functions of the baler are all driven hydraulically, and for this purpose, the drive line 36 is coupled for driving a plurality of pumps including a pump assembly 38 for delivering pressurized fluid to various hydraulic motors and hydraulic cylinders.

Integrated into the structure of the baler 10 is a crop re-hydration system 40 including a direct-fired steam generator 42 comprising a steam generator body 44 supported at an upper rear region of the baling chamber 24. The steam generator body 44 has an interior which defines a combustion chamber and comprises a major cylindrical section to which a cylindrical burner-head 46 is coupled, and a conical outlet section to which one end of an elbow 48 is coupled, the other end of the elbow being coupled to a primary steam distribution tube 50 extending fore-and-aft above the right-hand twine storage boxes 34, with a static mixer (not shown) being provided in a section of the tube 50 which is adjacent the elbow 48. A forward end of the steam distribution tube 50 is coupled to a top end of a vertical, main steam distribution manifold 52 mounted to a right-hand forward region of the baler 10. The main steam distribution manifold 52 is defined by a tube of rectangular cross section having its upper and lower ends closed by respective plates. A door (not shown) is provided in the bottom plate and is selectively opened to empty any solid particles which may have collected in the bottom of the manifold 52 during operation. Alternatively, the main steam distribution manifold could be defined by a vertically disposed cylindrical tube which is coupled to the forward end of the distribution tube by an elbow and which has a lower end closed by a particle collection cup coupled, as by threads, for being selectively removed from the bottom of the manifold. Spaced vertically from each other in a forward face of the manifold 52 are a plurality of outlets to each of which is connected a short tube, with which a steam control valve 54 is associated. As considered from top to bottom, steam distribution conduits 56, 58, 60 and 62 are respectively coupled to the short tubes downstream of the valves 54. The steam distribution conduit 58 is coupled to a central location of a rear side of a tubular steam injection manifold 64, of square cross section, that is located centrally above a forward region of the pick-up 16. A plurality of steam injection nozzles 65 (FIG. 3) are spaced transversely across a bottom surface of the manifold 64 for directing steam downwardly into a top region of a crop windrow being fed to the rear beneath the manifold 64. The steam distribution conduit 60 is likewise coupled to a central region of a rear side of a tubular steam injection manifold 66, of square cross section, located behind a lower rear region of the pick-up 16 and having steam injection nozzles spaced transversely across, and projecting forwardly from, a front side of the manifold 66 so as to direct steam into a lower region of the crop windrow as the windrow is elevated from the ground by the pick-up 16. The upper conduit 56 is coupled in a similar manner to a central region of a rear side of a steam injection manifold 68 located in a region between, and at a height above, the stub augers 18. Front and rear rows of steam injection nozzles 70 and 72, respectively, are spaced transversely across a bottom surface of the manifold 66 so as to inject steam into an upper region of the crop just prior to the crop being fed into the inlet of the pre-compression chamber 22 by the packer 20. The bottom steam distribution conduit 62 is coupled to a right, upper surface region of a further steam injection manifold (not shown) disposed such that upwardly directed steam injection nozzles direct steam to a lower region of the crop as it is being fed into the pre-compression chamber 22.

Figure 2:
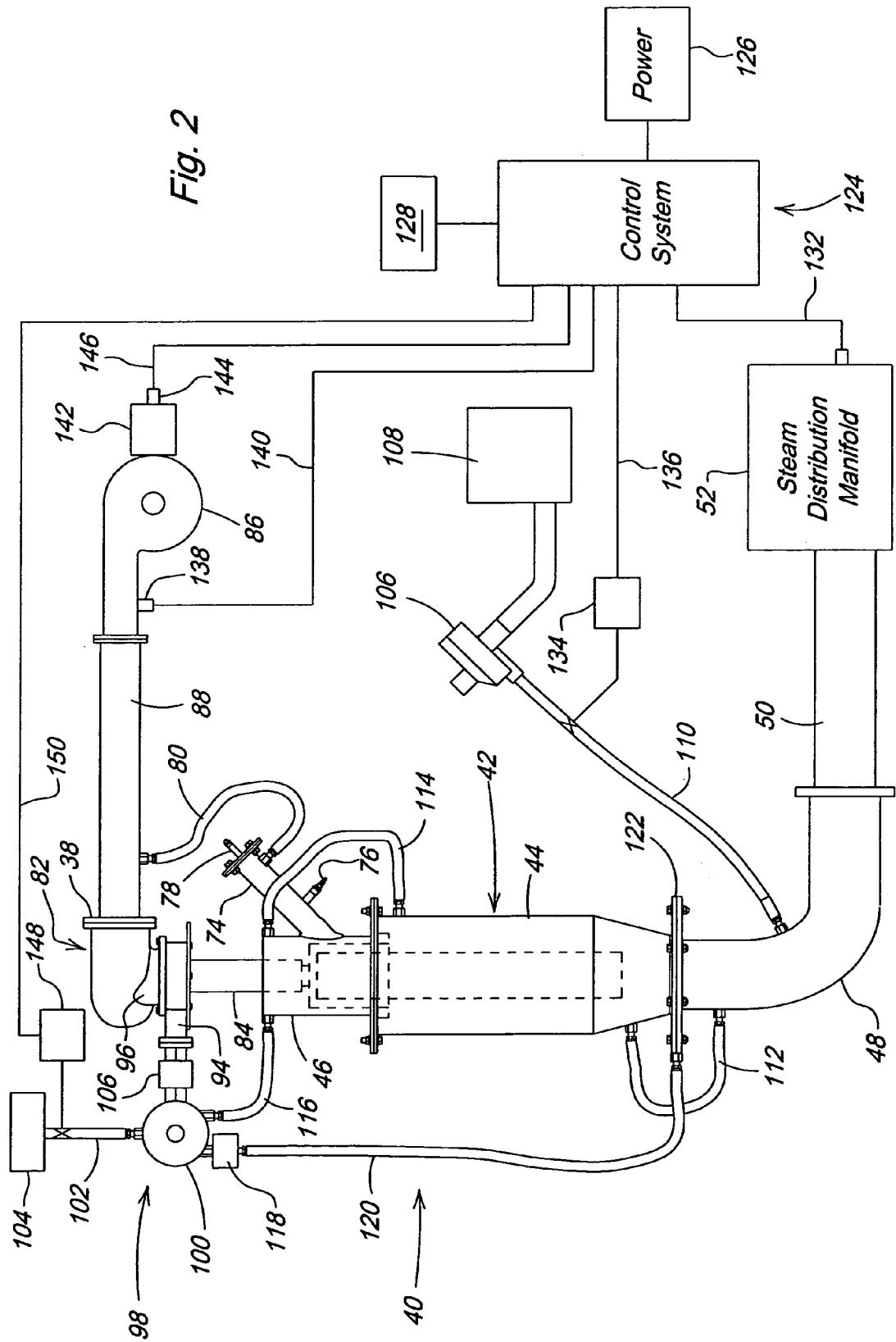
FIG. 2 is a schematic representation of the steam generator system of FIG. 1 together with a control system.

Referring now also to FIG. 2, it can be seen that a pilot burner arrangement including a tube 74 is coupled to the burner-head 46 so as to project through and terminate at an interior surface of a lower region of the burner-head 46. An igniter 76, which may be a spark plug or other type of sparking device, is mounted to the tube 74 so as to be positioned to selectively create a spark at an interior location of the tube 74 for igniting a fuel/air mixture resulting when vaporized fuel enters by way of a pilot fuel inlet 78 provided in a cover at an inlet end of the tube 68, and when air enters by way of a pilot burner air line 80 coupled to an upper location of the tube 74.

A carburetor 82 has an outlet coupled to an inlet end of the burner-head 46 by a short tube 84. Coupled between a main combustion air inlet of the carburetor 82 and an output of a variable output, air pump arrangement 86 is a combustion air supply conduit 88, with the inlet of the air pump arrangement 86 being coupled to an air cleaner 90 (FIG. 1) by a clean air inlet conduit 92. The carburetor 82 also has a main combustion fuel inlet 94 coupled to an outlet end of a throttle body 96.

A fuel converter assembly 98 includes a pair of converter bodies 100 (only one visible) each having a liquid fuel inlet coupled to a fuel line 102, which, in turn, is coupled, by way of a control system (not shown), to a propane tank 104, which is carried on an upper rear region of the baling chamber 24. The converter assembly 98 includes a gaseous fuel outlet, which is coupled to the combustion fuel inlet 94 of the carburetor 82 by way of a manifold 106. A water conduit section is located in the converter assembly 98 in heat-transfer relationship to the liquid fuel located in the converter assembly and carries hot water for imparting heat to liquid propane that enters the converter assembly 98 by way of the fuel line 102 so as to convert the liquid propane to gaseous propane which exits the converter assembly 98 and is drawn into the carburetor 82 by the action of the throttle (not shown) contained in the throttle body 96. Process water, used for forming the steam generated in the steam generator body 44, is also used for heating the liquid propane that enters the fuel converter assembly 98.

Specifically, the elbow 48, steam generator body 44 and burner head 46 are each provided with a double wall construction forming a water jacket for receiving cooling water for cooling the respective parts so that they do not become overly heated by the combustion that takes place in the burner head 46 and the steam generator body 44, and by the hot gases resulting from the combustion process. This cooling water is supplied by a water pump 106 coupled for drawing water from a pair of interconnected water tanks 108 respectively located beneath the twine boxes 36 at the opposite sides of the baler 10 and at respective locations centered above the tandem wheels 12, with only the right-hand water tank 108 being visible. The water pump 106 has an outlet coupled to the water jacket of the elbow 48 by a conduit 110, which in turn is coupled to the water jacket of the steam generator body 48 by a conduit 112, which in turn is coupled to the water jacket of the burner head 46 by a conduit 114. The burner head water jacket is provided with an outlet coupled to an inlet of the fuel converter assembly 98 by a hot water feed conduit 116. This process water flows out of the fuel converter assembly 98 into a manifold 118 that, in turn, is coupled to a conduit 120 that leads to a water injection device (not shown) contained in a joint 122 between the elbow 48 and the generator body 44 and which injects the water into hot combustion gases so that the water is turned into steam. It is noted that initially only some of the water is turned into steam, but, as the remaining water becomes more thoroughly mixed with the hot gases by the static mixer and also during traveling along the primary steam delivery tube 50, it too becomes steam prior to entering the primary steam discharge manifold 52.

An electronic control system 124 having a power source 126, such as a battery, is provided for controlling the firing rate of the direct-fired steam generator system 42. A key 128 is coupled to the control system 124 for inputting a signal representing a desired steam temperature. The actual steam temperature is obtained by a temperature sensor 130 mounted at an upper region of the main steam distribution manifold 52 and connected to the control system 124 by an electrical lead 132. The control system 124 is able to compare the desired and actual temperatures and to create a signal representing the difference or temperature error. A controllable water metering valve 134 is coupled to the control system 124 by an electrical lead 136, the metering valve 134 being operated for controlling the amount of process water injected into the lower end of the generator body 44 for being changed into steam.

The proper setting of the water metering valve 134 for producing steam at the desired temperature is dependent upon the heat output of the steam generator and this heat output is dependent upon the air mass flow going to the carburetor and/or the fuel flow. Accordingly, an air mass flow sensor 138 is provided in the air conduit 88 adjacent the air pump arrangement 86 and is connected to the control system 124 by an electrical lead 140. A variable speed pump and motor unit 142 is coupled for driving the air pump arrangement 86 and includes an electrically responsive controller 144 coupled to the control system 124 by an electrical lead 146. Varying the air pump speed will then vary the air mass flow rate. An electrically controlled fuel control valve 148 is provided in the fuel line 102 that extends between the fuel tank 104 and the converter bodies 100. An electrical lead 150 couples the control valve 148 to the control system 124.

Stored in memory in the control system 124 is a look-up table which correlates the water flow to the heat output of the generator burner for producing a desired steam temperature. The steam application rate is here varied by controlling one or more of the amount of process water provided for being changed to steam, and the amount of air provided for combustion in the combustion chamber. Specifically, the amount of process water delivered by the water pump 106 is controlled by solenoid operated control valve 134. The amount of air supplied for combustion is controlled by a displacement controller 144 associated with the hydraulic pump and motor unit 142 coupled for driving the air pump assembly 86, with it being noted that the amount of fuel mixed for combustion is automatically regulated in accordance with the amount of combustion air provided to the carburetor 82 by the action of the throttle contained within the throttle body 96, since the throttle body acts to ensure that a stoichiometric mixture of gas and air is present for combustion. Accordingly, by knowing the amount of combustion air supplied for combustion, the control system 124 will calculate an estimated heat output value of the flame within the steam generator body 44 and send a signal to control the water metering valve 134 so as to adjust the steam output temperature toward the desired temperature if there is a difference between the desired and actual steam temperatures. With the steam temperature sensor 130 located at the main steam distribution manifold 52, it has been found that a steam temperature of 250° F. is desirable in order to ensure that the steam arrives at the crop at a temperature close to that for saturated steam, under a variety of ambient conditions including wind, temperature, humidity and cloud cover, and differing steam production rates and steam distribution hose conditions.

Figure 3:
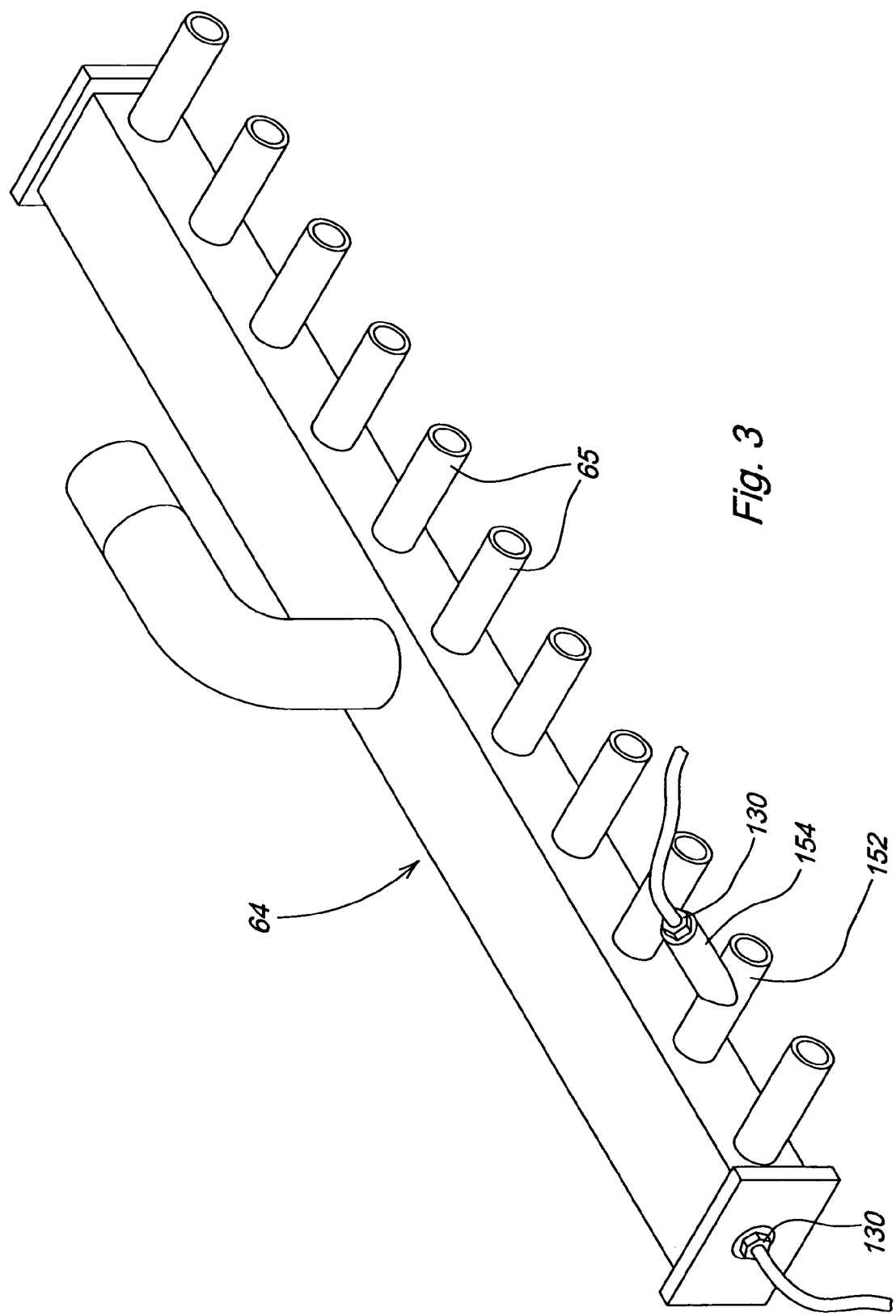
FIG. 3 is a perspective view showing alternate second and third locations for the mounting of the steam temperature sensor respectively at an end of one of the secondary steam distribution manifolds, and at a steam dispensing outlet tube.

Referring now to FIG. 3, there is shown two alternate locations where the temperature sensor 130 may be positioned, with both positions being shown on the same figure for convenience. Specifically, in FIG. 3, one alternate position of the temperature sensor 130 is at the left end of the steam distribution manifold 64, as considered from a position behind the manifold 64 and facing in the forward direction of travel of the baler 10. Since the steam at this location has undergone approximately a maximum distance of travel before exiting onto the crop, a suitable steam temperature at this location would be somewhat less than 250° F., for example, in the neighborhood of 220° F., so as to ensure that only steam, and no water droplets come into contact with the crop. Another possible location for positioning the steam temperature sensor 130 is at one of the steam injection nozzles located along the bottom of the steam injection manifold 64. In this case, one of the nozzles 65 is replaced by a nozzle 152 having a branch 154 serving as a mounting location for the temperature sensor 130. This location too is quite close to the crop and is at almost the maximum distance that the steam must travel before coming into contact with the crop. Again, a temperature of about 220° F. would be a suitable steam temperature for ensuring that only steam, not water droplets, come into contact with the crop. These two locations for the mounting of the temperature sensor 130 would actually be preferable to the mounting at the steam distribution manifold 52, as previously described, since the steam temperature sensed at the injection manifold or injection tube closely approximates that of the steam applied to the crop, while the temperature at the main distribution manifold 52 often is higher than it needs to be in order that no liquid water reaches the crop during extreme ambient or other conditions. Such a high steam temperature setting wastes heat energy for most of the normal operation periods.

In operation, initially, a look-up table containing data correlating incremental changes in water flow to changes in the temperature of the steam produced by the steam generator 42, when operating at a given heat output, is stored in the memory of the electronic control system. Then assuming that the baler 10 is positioned in a field for baling windrows of dry crop, the crop re-hydration system 40 will be put into operation by turning on the combustion air pump 86 for supplying air at a relatively low rate to the carburetor 82 while simultaneously opening the fuel valve so as to provide liquid fuel to the fuel converter bodies 100. At this time the water metering valve 134 is actuated to provide a low water flow and this water, although relatively cool, will have sufficient heat to vaporize the fuel at a slow rate. As soon as gaseous fuel is available, the fuel and air respectively entering the pilot burner tube 74 by way of the coupling 78 and air tube 80 will form an air/fuel mixture that is ignited by energizing the igniter 76. Once the pilot burner is lit, the steam generator continues in operation at a low firing rate for a few seconds until the water becomes heated to the extent that it can vaporize fuel at a sufficient rate to maintain a flame in the combustion chamber with the steam generator 42 operating at an increased firing rate. When this water temperature is reached, the speed of the air pump 86 is increased with the throttle within the housing 96 of the carburetor then creating sufficient pressure drop to cause the fuel valve arrangement (not shown) located between the converter bodies 100 and the carburetor to open. Gaseous fuel is then drawn in at a rate determined by the air flow rate and is mixed by the carburetor 82 so that a stoichiometric mixture is present, which is ignited by the pilot burner.

The air flow is monitored by the flow sensor 138 and a signal representing this flow is sent to the control system 128, which operates to estimate the heat output of the steam generator 42 on the basis of the amount of heat energy in the fuel being consumed. Meanwhile, the process water is being injected into the lower region of the generator body 44 by an injector contained within the joint 122. This injected water will come into contact with the hot combustion gases and be changed to steam as it becomes mixed with the combustion gases. Due to the operation of a static mixer contained in the steam distribution tube 50 at a location adjacent the elbow and the length of tube 50 extending from the static mixer to the steam distribution manifold 52, the injected water will be thoroughly mixed with the hot gases and changed to steam before reaching the manifold 52. The steam temperature sensor 130 will determine the temperature of the steam and send a representative signal to the control system 128 where it will be compared with the desired steam temperature. If the sensed steam temperature is greater than that desired, the control system 128, taking into account the estimated heat output of the steam generator, will determine the difference and will send a signal to the water metering valve 134 causing it to operate to incrementally increase the water flow by an amount for causing the steam temperature to decrease by the difference between the actual and desired steam temperatures. Of course, a similar operation will take place to increase the steam temperature if the measured temperature is below that desired. but, in this case the metering valve 134 will be sent a signal to cause it to incrementally decrease the water flow.

Thus, it will be appreciated that by using an estimate of the heat output of the steam generator 42 and the look-up table correlating incremental changes in water flow to changes in steam temperature for a given heat output, it is possible to quickly adjust the water flow rate so as to maintain a nearly constant steam output temperature as the baler 10 operates in different load conditions causing the output of the air pump 86 to vary or in different atmospheric conditions causing the measured steam temperature to vary.

Having described the preferred embodiment, it will become apparent that various modifications can be made without departing from the scope of the invention as defined in the accompanying claims.

The invention claimed is:

1. A method for re-hydrating crop with steam during the baling process, comprising the steps of:

a) operating a direct-fired steam generator of a crop re-hydration system for creating steam and effecting delivery of said steam through a steam distribution system and onto a crop being baled;

b) selecting a desired steam temperature;

c) measuring an actual steam temperature and calculating the temperature difference between said desired steam temperature and said actual steam temperature;

d) collecting data from which an estimated heat output of said steam generator can be calculated, and calculating said heat output; and, if said actual steam temperature differs from said desired steam temperature, e) adjusting the heat output by increasing or decreasing a flow of process water to said direct-fired steam generator for respectively causing a decrease or an increase in said actual steam temperature so as to arrive at said desired steam temperature.

2. The method of re-hydrating crop, as defined in claim 1, wherein the actual steam temperature is measured at a location in said steam distribution system wherein only steam is present.

3. The method of re-hydrating crop, as defined in claim 2, wherein the actual steam temperature is measured at a location closely adjacent a steam injection nozzle of said steam distribution system.

4. In a combined crop baler and crop re-hydration system including a direct-fired steam generator having a combustion chamber, a source of gaseous fuel and a source of combustion air controlled for forming a stoichiometric mixture that is coupled for producing a flame within said combustion chamber, a source of process water coupled to said combustion chamber for coming into contact with hot combustion gases and changing to steam, a steam distribution system coupled to said combustion chamber for conveying a mixture of steam and combustion gases to crop being picked up by said baler for being baled, an electrically controlled water metering valve coupled between said source of process water and said steam generator for controlling the amount of process water directed to said steam generator for being changed to steam, and an electrically responsive controller being coupled to said source of combustion air for varying the air mass flow, the improvement comprising: an electrical control system having a memory in which is stored a value representing a desired steam temperature, and in which is stored a look-up table containing information correlating incremental changes in process water flow to changes in steam temperature for a given heat output of the steam generator; said water metering valve being coupled to said electrical control system; at least one of a combustion air mass flow sensor and a fuel flow sensor being mounted in a location for determining at least one of the amount of air and the amount of fuel being delivered for combustion in said combustion chamber, and being coupled to said electrical control system and sending a signal representative of a sensed flow; a steam temperature sensor being located in said steam distribution system for sensing an actual temperature of the steam created by the steam generator and being coupled for sending a signal to said electrical control system, which is representative of said actual temperature of said steam; and said control system being operative for determining the difference between said desired steam temperature and said actual steam temperature, for calculating a heat output of said steam generator based on the sensed combustion air flow and/or fuel flow and for sending a signal to said water metering valve for adjusting the flow of process water by an amount, determined by said look-up table, for effecting a change in the actual steam temperature so that it approaches said desired steam temperature.

5. The combined crop baler and crop re-hydration system, as defined in claim 4, wherein said source of combustion air flow and said source of fuel are coupled to said combustion chamber by way of a carburetor which acts to cause the amount of fuel used in combustion to vary in accordance with the amount of air flowing through the carburetor; and only said air mass flow sensor being used, with the amount of fuel used in combustion being determined indirectly by the amount of air used in combustion.

6. The combined crop baler and crop re-hydration system, as defined in claim 4, wherein said steam temperature sensor is located in said steam distribution system at a location where only steam exists.

7. The combined crop baler and crop re-hydration system, as defined in claim 6, wherein said baler includes a crop pick-up; and said steam distribution system includes a tubular steam injection manifold to which a plurality of injection nozzles are coupled for injecting steam directly into crop being lifted into said baler; and said steam temperature sensor being mounted for sensing the temperature of steam inside said steam injection manifold.

8. The combined crop baler and crop re-hydration system, as defined in claim 6, wherein said steam temperature sensor is mounted for sensing the temperature of steam inside one of said plurality of injection nozzles.

* * * * *